Oct. 24, 1967  W. G. REVELEY  3,348,905
METHOD FOR STERILIZATION OF AN OINTMENT IMPREGNATED GAUZE
Filed May 18, 1964  3 Sheets-Sheet 1

INVENTOR.
WILLIAM G. REVELEY
BY
MORGAN, FINNEGAN, DURHAM & PINE
ATTORNEYS

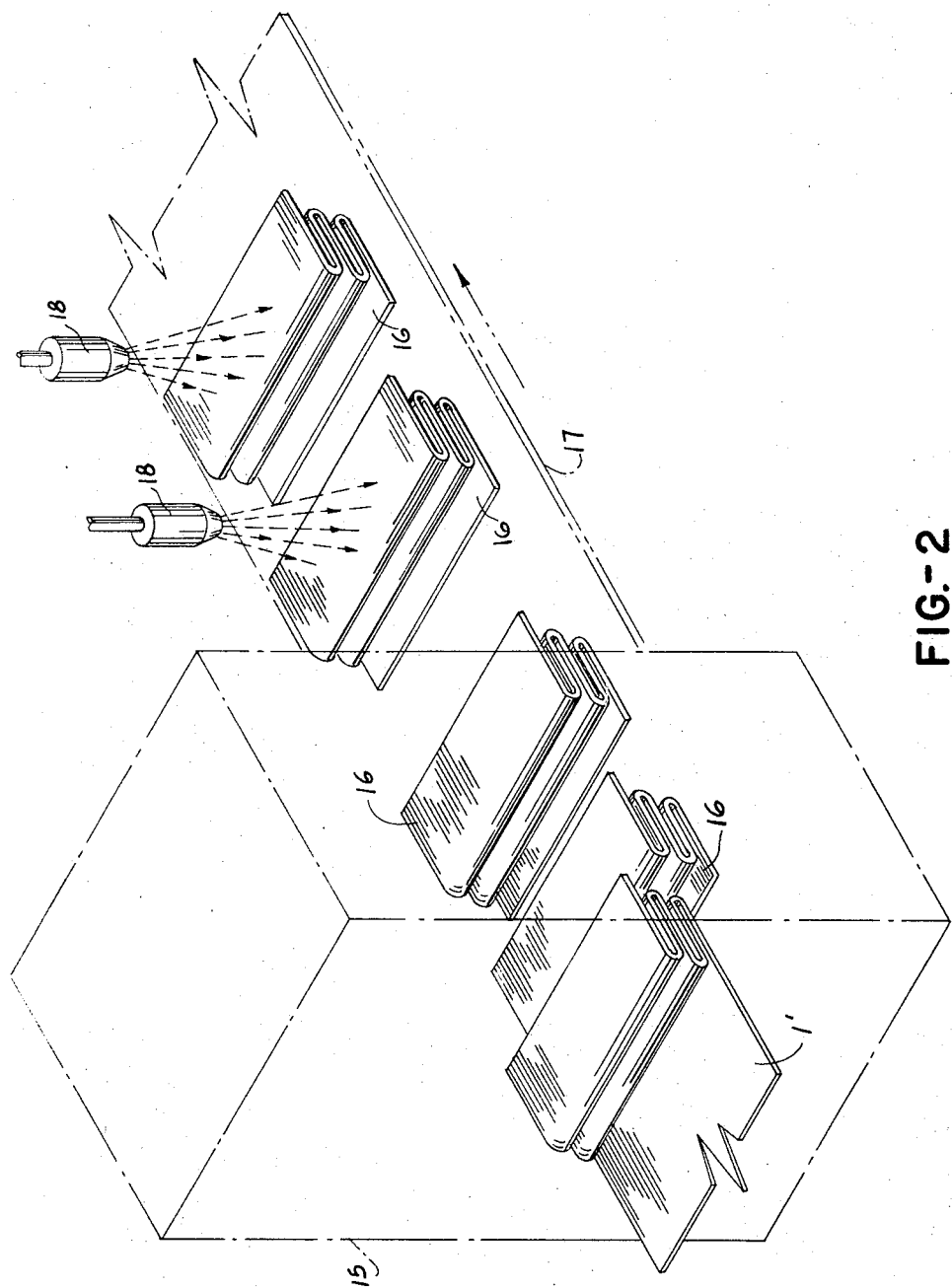

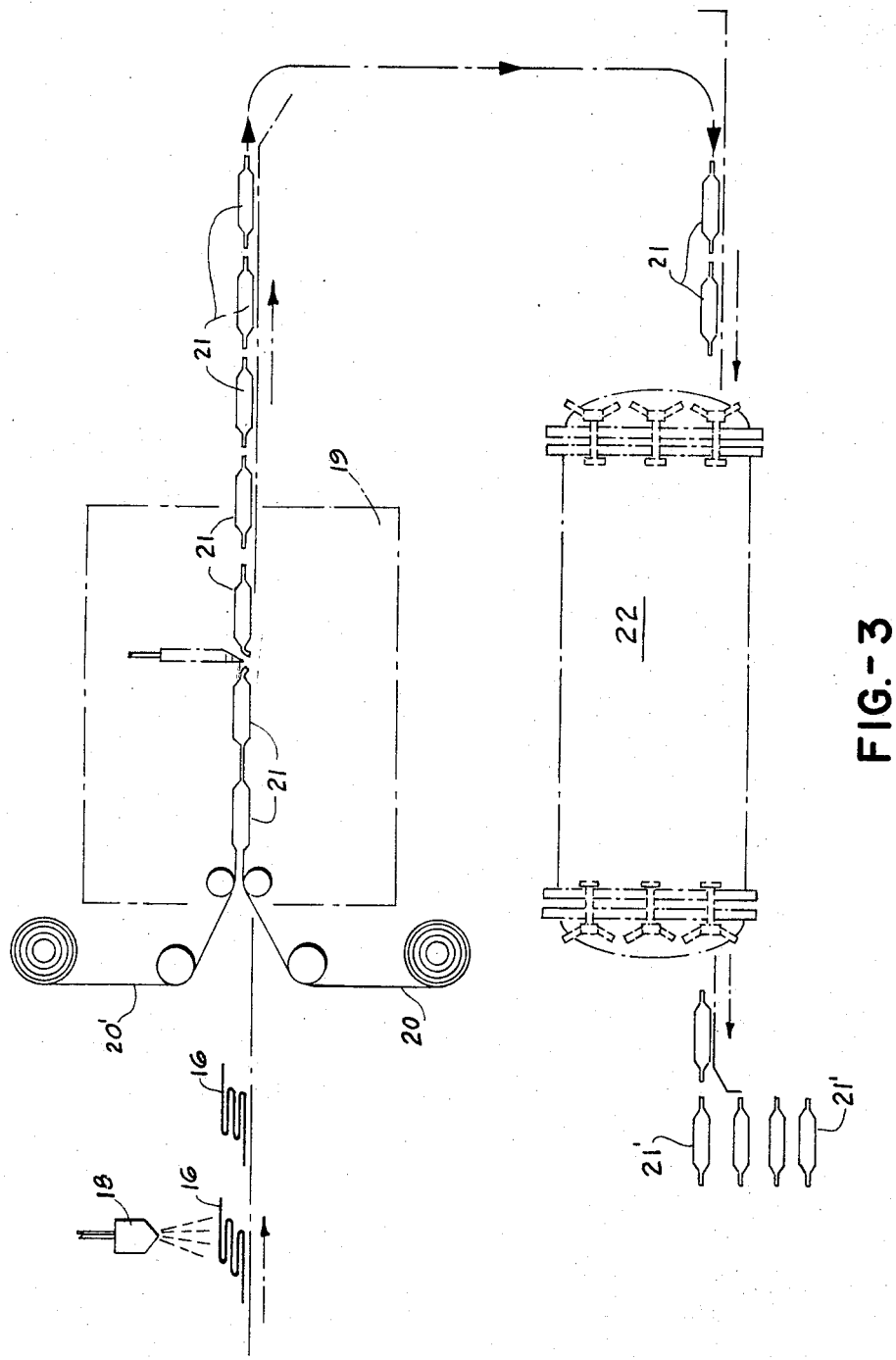

United States Patent Office 3,348,905
Patented Oct. 24, 1967

3,348,905
METHOD FOR STERILIZATION OF AN OINTMENT IMPREGNATED GAUZE
William G. Reveley, Old Saybrook, Conn., assignor to Chesebrough-Pond's, Inc., New York, N.Y., a corporation of New York
Filed May 18, 1964, Ser. No. 368,061
14 Claims. (Cl. 21—56)

This invention pertains to a method for the sterilization of an ointment impregnated guaze, particularly a petrolatum impregnated gauze.

The sterilization of certain substances by the methods of steam sterilization frequently constitute a difficult problem. Products containing oils and petrolatum, important constituents of ointments used in the preparation of ointment impregnated dressings, have long been recognized as quite difficult to sterilize by steam sterilization. Curran (Bact. Rev., 16, 111–117 (1952)) in discussing steam sterilization notes that "Heat resistant is markedly increased when spores are suspended in oily materials and the resistance of dry spores in completely anhydrous fat approaches that of dry sterilization." Perkins in the publication, "Antiseptics, Disinfectants, Fungicides and Sterilization," edited by C. F. Reddish, and published in 1957, by Lea and Febiger, lists petrolatum as being impervious and as one of several materials the presence of which could be responsible for sterilization failures. He states that, "The preparation and sterilization of petrolatum gauze has long been a troublesome procedure," and recommends dry sterilization at a temperature of 160° C. for 2½ hours. In speaking of the protection afforded spores, as well as vegetative organisms, by sugars, syrups, starch, nucleic acids, albumin, gelatin and glycerol, Sykes, on page 98 of his book, "Disinfection and Sterilization," published by D. Van Nostrand Company, Inc., in 1958, suggests that oils and fats probably act the same way and comments, "The effect of (oils and fats) is most marked with moist heat and arises presumably because fats prevent access of moisture to the cell and so create conditions approaching that of dry heat treatment." Underwood ("Textbook of Sterilization," The Lakeside Press, R. R Donnelley & Sons Company, 1941) includes various oils and petroleum jelly in a list of compounds that cannot be sterilized completely in the steam autoclave.

Thus, we see that the presence of oils, fats, or petrolatum in the dressing makes the sterilization process unusually difficult. As a matter of record, the process is so difficult that the commercial process that has been heretofore used by a leading manufacturer, provides for the sterilization of the partly assembled package (envelope plus cotton gauze) and of the petrolatum separately. A process that would enable one to sterilize a finished package, or for that matter even the assembled package, is obviously much more desirable than the aforementioned commercial process.

An added difficulty in connection with the sterilization of dressings composed of several different materials is that the various components are not equally stable to the temperatures required for sterilization. This is particularly true of pertolatum impregnated cotton dressings. Cotton darkens appreciably after exposure to steam at 250° F. for one hour and deteriorates rapidly thereafter. Since sterilization of petrolatum is a matter of prolonged exposure at this temperature, prior to my invention the simultaneous sterilization of the two components of petrolatum impregnated cotton dressings seemed impossible.

The most efficient operation of the packaging and sterilization process would require that the sterilization be effected after the oil- and water-impermeable package is assembled and sealed to eliminate the possibility of accidental contamination of the components during packaging and sealing, and, accordingly, to drastically reduce the complexity of the operation. Unfortunately, if this is done, it is no longer possible for steam to reach the contents of the package, a condition which further increases the difficulty of achieving complete sterilization. As an indication of how much, Perkins concludes from available data that exposure to moist heat (steam) at 250° F. for 10 to 15 minutes is approximately equivalent to exposure to dry heat (absence of steam) at 320° F. for 60 minutes.

From the foregoing, it is seen that heretofore it has not been possible to sterilize dressings after assembly and sealing containing oils, fats, and particularly petrolatum and a fibrous material having a thermal stability in the range of cotton.

Objects and advantages of the invention will be set forth in part hereinafter and in part will be obvious herefrom.

It is an object of this invention to provide a process for the sterilization of hermetically sealed packages containing dressings comprising a gauze impregnated with a hydrophobic ointment, and, in particular, cotton gauze impregnated with petrolatum. Another object of this invention is to provide a simple package which after assembly and hermetically sealing can be sterilized under conditions that do not cause degradation of the components of the package, in times which permit reasonable production rates, and in equipment which approximates the normal equipment used for such an operation. Another object of this invention is to eliminate the requirement that any phase of the manufacturing operation be carried out in a sterile atmosphere by personnel scrubbed, gowned, and masked, who must take all the precautions, and more, required of an operating surgeon and his assistants. Another object of this invention is to increase the assurance of sterility by increasing the dependability of the sterilization process and the sterility control procedures. A still further object of this invention is to provide a method of assembly of the desired package which will insure a high degree of uniformity of package composition. A still further object of the invention is to reduce the percentage of unacceptable packages (rejects) that result by reason of the multiple hand operations required in the present aseptic process. Yet a further object of this invention is to eliminate as a separate step the heat treatment of the finished package in which the package is held at a suitably elevated temperature for a time sufficient to melt the ointment and to cause it to be dispersed throughout the gauze and to thereby thoroughly impregnate it.

FIGURES 1 to 3 illustrate an assembly for carrying out the process of this invention.

FIGURE 1 is an isometric view of a first portion of the assembly illustrating the passing of cotton gauze through a humidifying chamber and subsequent coating of the conditioned gauze by passing it through a bath of ointment such as petrolatum.

FIGURE 2 is an isometric continuation view of the second portion of the assembly wherein the coated gauze is passed to a pleating machine where it is cut and formed to yield pleated dressings, the pleated dressing being then carried by a conveyor belt past nozzles which supply each dressing with additional ointment.

FIGURE 3 is a diagrammatic side view of the last portion of the assembly showing the packaging of the pleated dressings which are then cut into individual packages, passed to an autoclave where they are sterilized and the desired sterilized packages are recovered.

Figure 1:
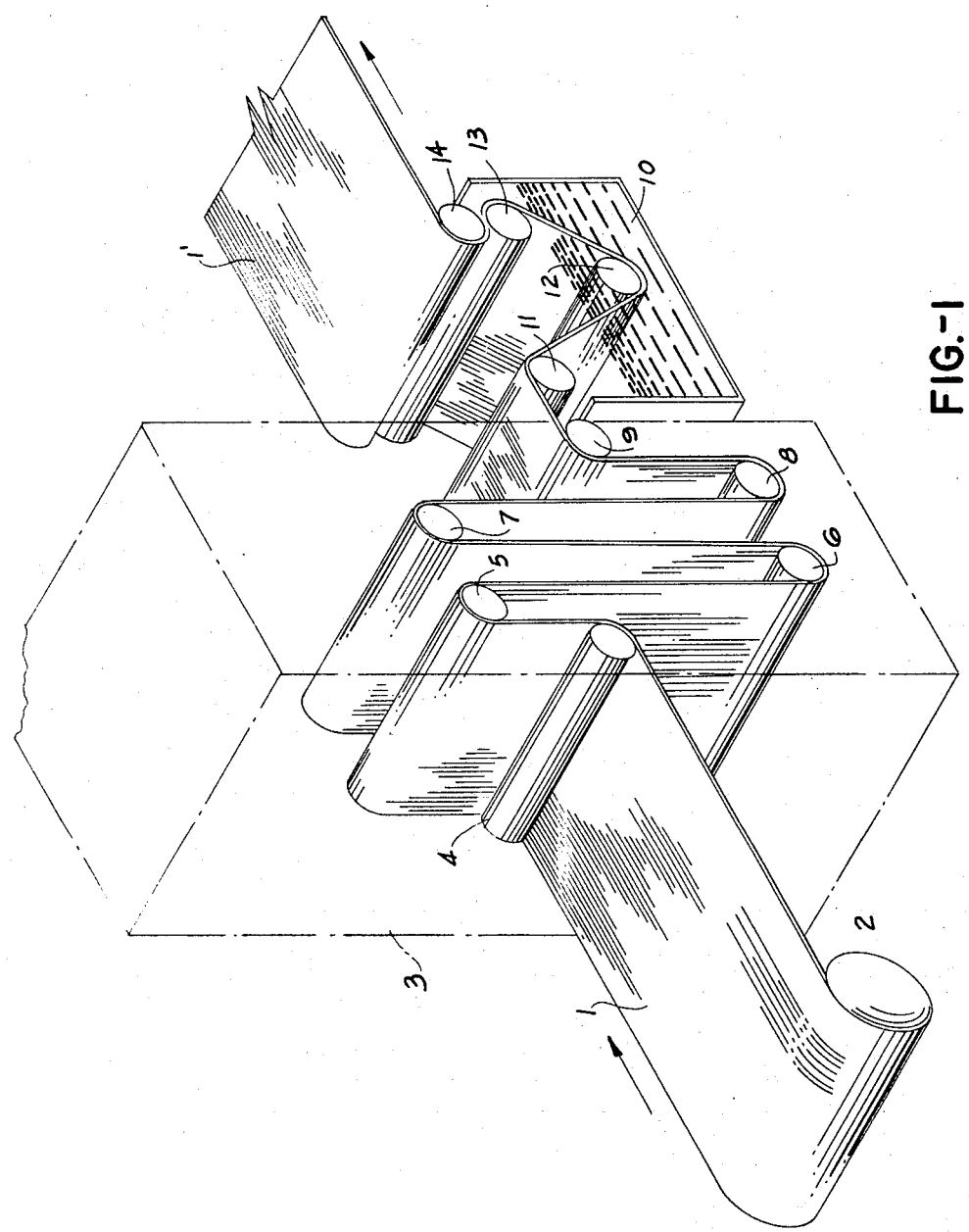

It has been found that the objects of this invention may be realized by: (1) preconditioning a gauze under such conditions that there is uniformly distributed therethrough, water, in an amount of at least 5% by weight of the dry gauze; (2) impregnating the preconditioned gauze with an ointment, (3) enclosing said ointment impregnated gauze in an envelope of a flexible protective material to form a package, (4) hermetically sealing said package; and, (5) heating said package in a pressure chamber under suitable conditions of temperature, pressure and time to effect sterilization of the ointment impregnated gauze without causing distortion of the envelope. Preferably, prior to sealing the envelope before it is subjected to a sterilization operation, the air content of the envelope is reduced to the point where only a moderate proportion of additional external gaseous medium be needed during sterilization to prevent rupture of the envelope.

As indicated heretofore, the first step of my process relates to preconditioning the gauze so that there is distributed uniformly therethrough, water in an amount of at least 5% by weight. Surprisingly, it has been found that the amount of water required to cause complete sterilization is small. About 0.35 g. is sufficient to insure sterilization in a 3 x 6½ inch (inside dimensions) laminated plastic-foil envelope containing 31 g. of petrolatum and 7.0 g. of cotton gauze. A smaller sized packaged consisting of 7.9 g. of petrolatum and 1.8 g. of gauze in an envelope 2⅛ x 3⅜ inches requires an approximate minimum of 0.09 g. of water to effect complete sterilization. As a generalization, it can be said that the minimum quantity of water required for dependable sterilization results is about 5.0% of the weight of the dry gauze. In terms of free space within the expanded packages, the concentration of water is $4.6 \times 10^{-3}$ g./cc. and $3.0 \times 10^{-3}$ g./cc. for the small and large packages, respectively (the concentration of water required to saturate the free vapor space at the given sterilization temperature is $1.16 \times 10^{-3}$ g./cc.).

The upper limit of moisture content is set by the capacity of the gauze to absorb the moisture present without becoming noticeably damp, or interfering with the adherence of the ointment to the gauze or with uniform distribution of the ointment throughout the gauze. It has been found that a most suitable range or moisture content for obtaining dependable sterilization results without interfering with the desired ointment impregnation of the gauze is in the range of 5 to 10% moisture by weight of the dry gauze.

It has been found that not only the content but also the distribution of moisture is important. It was discovered that the simple introduction of the requisite quantity of moisture into the package containing the dressing is not sufficient to cause sterilization. Surprisingly, it was discovered that distribution of the moisture throughout the ointment is not essential and does not lead to uniform and dependable sterilization results. Instead, and totally unexpectedly, it was discovered that the gauze must be moist and that the distribution of the moisture on the gauze is all important. To provide absolute dependability, it is not sufficient to disperse as the liquid a quantity of water on the gauze within the limits set forth in this invention; the water must be distributed as water vapor throughout the gauze prior to coating thereof with the ointment.

The requirement that the moisture be distributed on the gauze instead of throughout the ointment is in the face of the teachings of the prior art with regard to the relative difficulty of sterilization of the two components. As a possible explanation for this paradoxical situation, it is believed that the impregnated gauze immobilizes the melted ointment phase at the temperature of sterilization and this interferes with the convection that would normally cause complete saturation of all of the ointment by the moisture present. By uniformly distributing the moisture on the gauze, the moisture is predistributed throughout the immobilized ointment phase, thus providing moisture at those points that cannot be otherwise supplied by convective forces.

In preconditioning the gauze any suitable humidifying procedure may be used. The manner in which the moisture is added to the gauze is determined, to a considerable extent, by the hygroscopicity of the gauze. When a hygroscopic fibre such as rayon or cotton is used, the proper amount of moisture may be distributed on the fibre by exposing the fibre for a suitable time to an atmosphere of a suitable humidity. Or, alternatively, the requisite amount of moisture may be distributed as the liquid on the gauze, but sufficient time must be allowed for the liquid to partially evaporate and permeate the vapor space within the interstices of the gauze fibers.

The preferred technique for effecting the desired preconditioning step is that described in detail in Example V given hereinafter which discloses a highly efficient continuous process employing the preferred principles of this invention.

After the gauze is preconditioned to the desired moisture content, the gauze is then impregnated with an ointment. According to the modern theory of wound treatment, particularly that of burn wounds, the dressing should have an open mesh structure (to permit drainage of the serous exudate through the dressing into the absorbent backing) and composed of elements that are non-adherent to the wound at any stage of the healing process. In particular, it is important that the dressing be non-adherent to regenerating tissue (granulation tissue) so that removal of the dressings does not entail fresh injury caused by stripping of regenerating tissue. The purpose of the ointment impregnant is to thus reduce the danger of adhesion to the wound by the fibres of the gauze.

It is important therefore that the ointment impregnate the gauze thoroughly without blocking the open mesh structure of the gauze. This result can be accomplished if the ointment is poured over the gauze and melted while in contact with the gauze. The wicking action of the gauze, under these conditions, causes the liquid ointment to be absorbed by the gauze uniformly without excessive blockage of spaces between the warp and woof of the fabric. As indicated hereinbefore too high a content of moisture, however, destroys this wicking action by increasing the interfacial energy (tension) between the gauze and the hydrophobic ointment. In this case the ointment no longer uniformly impregnates the fibre; instead it tends to pool on the surface of the fibre blocking some areas of the gauze completely and leaving other areas uncoated. As indicated hereinbefore, it has been found that this effect becomes noticeable when the moisture content of the gauze approaches 10%, and at moisture levels much above this value, the dressings are rendered unsuitable for use. The moisture content of the package therefore should be restricted to the lowest levels consisting with dependable sterilization results. In any case, it should not exceed twice the minimum values stated above or 10% of the weight of the gauze.

The gauze should be preconditioned to the desired moisture content prior to impregnation with the ointment so that the petrolatum upon application to the preconditioned gauze will lock the moisture in the gauze and prevent appreciable loss thereof during the remainder of the operation and before the final packaging step.

In general, the petrolatum ratio varies from 100% to 500% of the weight of the gauze. Accordingly, the ratio of moisture to petrolatum varies from 5 to 10% down to 1-2%.

After the gauze has been impregnated with the ointment, the gauze is then inserted in a flexible protective envelope. Preferably, the package employed is of the type disclosed in U.S. Patents 2,402,981 and 2,402,982. More particularly, the ointment impregnated gauze is folded in a zig-zag manner so that one edge of each fold is positioned so that it projects a substantial distance beyond the corresponding edge of the subjacent fold. The folded strip of ointment impregnated-gauze is then enclosed by the protective envelope. Prior to sealing the envelope, as will be readily apparent from the detailed description in Example V, it is preferred to reduce the air content of the envelope to a point where only a moderate proportion of additional external gaseous medium be needed to prevent rupture of the envelope.

The envelope is then sealed thus protecting the ointment impregnated gauze against entry of contaminating material. Preferably, the envelope is provided with a tearable side edge portion and the gauze with a thread for facilitating withdrawal of the gauze from the envelope in the manner described in detail in U.S. Patents 2,402,981 and 2,402,982. Alternatively, the envelope may be provided on the side adjacent to the afore-mentioned extending edge of the dressing free ends and a seal capable of being torn apart without rupture of the films comprising the two surfaces of the envelopes. The package thus constructed may be readily and conveniently opened by pulling the free ends apart, breaking the seal and exposing the dressing with reduced danger of accidental contact between the unsterile outer surfaces and the sterile contents of the package.

The hermetically sealed package is then inserted in a pressure chamber, normally an autoclave, and the package is then subjected to heat under suitable conditions of pressure, time and temperature to effect sterilization of the ointment impregnated gauze without causing distortion of the envelope.

In general, the sterilization is carried out at a temperature in the range of 230–270° F. for a time in the range of 5 to 185 minutes. Excellent results have been achieved by subjecting the sealed envelope to a temperature of 250° F. for 30 minutes. Of course, the lower the sterilization temperature that is employed, the longer the sterilization time required, e.g., at 230° F. for 185 minutes or at 270° F. for 5 minutes.

As indicated hereinbefore, the conditions of sterilization are such that distortion of the envelope is avoided. The water vapor in the package, in addition to air present therein, at effective sterilization temperatures, exerts a vapor pressure that is sufficient to distort the flexible envelope of limited strength. Accordingly, in order to prevent distortion or rupture of the envelope, there is provided a compressible medium, which when heated during sterilization, in the pressure chamber, exerts a pressure sufficient to substantially balance the pressure within the sealed envelope and thereby prevent distortion or rupture of the envelope.

In the preferred sterilization operation of this invention, the hermetically sealed package is heated in an autoclave with a mixture of steam and air at 250° F. for 30 minutes (after the package has reached equlibrium temperature). The combined absolute pressure of air plus saturated water vapor at 250° F. within the package is calculated as 49.3 p.s.i.a., if the package is sealed at 75° F., assuming no volume change and assuming that the air present behaves as an ideal gas. The differential pressure between the package and an autoclave containing only steam as the heating medium would then become 19.5 p.s.i. It would be possible to balance this excess pressure by introducing air or some other gas into the autoclave, but under these conditions uniform heating of the autoclave load throughout its contents becomes difficult since the advantages of saturated steam as a heating medium are thereby lost (in an autoclave containing only saturated steam a temperature imbalance creates a corresponding pressure differential which acts as a driving force to restore the temperature equilibrium conditions; this is not true if there is any appreciable proportion of air present). Since the envelope is flexible, it will expand to some extent to relieve the pressure differential, but not sufficiently to prevent rupture at 250° F. under the pressure of saturated steam.

It was found that by supporting the assembled package sealed on three sides in a vertical position with the open side up and by heating the ointment above its melting point, but below the boiling point of water, it was possible to eliminate most of the air in the package before the final seal. Alternatively, the same effect can be accomplished by cooling the ointment well below its melting point and applying pressure to the envelope, held in a horizontal position, before the final seal. Either method was found to reduce the air content of the package to the point where only a moderate proportion of air needed to be mixed with the steam to prevent rupture of the envelope. It has been found also desirable to precoat the moist gauze with part of the ointment by passing the moist gauze through a bath of the ointment and then rollers to force the ointment into the interstices of the fibre and so to displace air present.

It has thus been discovered that the hermetically sealed package when formed with the foregoing components and under the foregoing conditions requires only a slightly higher pressure for prevention of rupture than that generated by saturated steam at the sterilization temperature. For example, at 250° F. the absolute pressure of saturated steam, 29.8 p.s.i.a., need only to be supplemented by 5–10 p.s.i. air pressure in the autoclave to eliminate the problem of package rupture.

It is desirable that the combined air and steam pressure in the autoclave be less than the combined air and water vapor pressure inside the unexpanded package, so that the package will expand and provide an extended vapor space above the dressing which can serve as a vapor passage between the various areas in the package. It has been found that approximately 20–25 p.s.i.g. (35–40 p.s.i.a.) at 250° F. is a satisfactory autoclave pressure.

The gauze may be made of cotton, rayon, or any fibre which is non-injurious to wound tissue, including some of the newer synthetics.

The ointment may be petrolatum or it may be composed of essentially hydrophobic materials other than petrolatum as, for example, mineral oil, silicone oil, lanolin and derivatives of lanolin, the various glycerides, and other materials which are non-injurious to wound tissue and which will protect the wound against excessive moisture loss and against adhesion of the gauze to the wound as it heals.

In order to describe more fully, the following specific examples are now given. It should be noted that Example V illustrates a continuous process for carrying out the principles of this invention, and is particularly suitable for commercial operation.

*Example I*

The purpose of this experiment was to establish the lower limits of moisture content required for sterilization of the described packages.

Previously dried samples of pleated gauze weighing about 7.0 g. each were conditioned by exposure to various quantities of moisture in a sealed vessel over a period of two days. The samples of moist gauze were placed in a laminated plastic-aluminum foil envelope measuring 3½ x 6½ inches (inside dimensions) together with 31 g. of petrolatum containing thoroughly dispersed therein, as a contaminant, $2 \times 10^6$ spores of a heat resistant strain of bacteria (*Bacillus subtilis* var. *aterrimus*). The envelopes were heat sealed and heated in an atmosphere of steam and air in an autoclave at 20 p.s.i.g. and 250° F. for 30 minutes to one hour after the autoclave and its contents had reached operating temperature (the interval required to heat the autoclave from room temperature to 250° F. was 15 minutes). Examination of the contents of the packages for sterility by culturing, according to the method given in U.S. Pharmacopeia XVI, page 855, disclosed the absence of bacterial growth in all samples containing 0.35 g. or more of moisture. All samples having less than 0.27 g. returned positive cultures.

*Example II*

This sample illustrates the importance of moisture distribution on the gauze as a factor in determining sterilization.

To 20 samples of dry pleated gauze of the same size as in Example I were added amounts of water ranging from 0.38 g. to 0.50 g. The water was applied to the gauze in a small stream from a syringe along the length of its long axis, but no attempt was made to otherwise distribute the moisture on the gauze. Contaminated petrolatum having the same concentration of spores as in Example I was added and the package sealed and immediately autoclaved for 60 minutes as in Example I. All samples returned positive cultures.

*Example III*

The fact that dispersion of the water in the ointment, as an alternative method to the distribution of water in the gauze, reduces the degree of dependability of the method is shown by the following example.

Various proportions of water, ranging from 0.93% to 1.48%, were dispersed in petrolatum in a Waring Blendor at a temperature high enough to permit good mixing and dispersion of the water in the petrolatum, but low enough to prevent settling of the dispersed droplets of water. A non-bacterially active, water-soluble dyestuff (Guinea Green) was added to the water as a tracer to insure its uniform dispersion in the petrolatum. The petrolatum was contaminated with spores of heat-resistant bacteria at the level specified above and added in the amount of 31–32 g. to the above dscribed envelope containing dried cotton gauze of the above specified weight and dimensions. The envelopes were sealed and a portion heated in a steam autoclave at 17 p.s.i.g. and 250° F. for 30 minutes and the remaining portion heated under the same conditions for 60 minutes. When the contents were cultured according to the previously identified method, only two of the 20 samples yielded negative cultures. These contained the highest amount of moisture (about 0.47 g. per package) and were heated for the longer interval (60 minutes). Another sample containing the same amount of moisture and heated for the same interval gave a positive culture; all samples having this amount of moisture but heated only 30 minutes returned positive cultures.

*Example IV*

Samples of pleated gauze containing amounts of water varying from 0.40 g. to 0.60 g. (average 0.50 g.) were conditioned as in Example I. The samples were impregnated with contaminated petrolatum, sealed in foil envelops and autoclaved for 30 minutes as in Example I. Of 57 samples containing moisture, 57 returned negative cultures. Of 3 samples (controls) containing no moisture, 3 returned positive cultures.

*Example V*

A detailed description of a continuous process will now be described embodying the preferred techniques of this invention.

To obtain maximum efficiency from the process, it is desirable to handle the gauze, insofar as possible, on a continuous basis. This means that the steps of moistening the gauze, coating it with the impregnant, forming it into the desired pattern, and packaging of the assembled dressing should be made part of one continuous operation. Of these, the moistening step seemed to offer the most difficulty. To insure a completely uniform distribution of moisture throughout the gauze, it is desirable to add water in the form of its vapor, and further to insure that the proper proportion of water be absorbed at all times, independently of the original moisture content of the gauze or of process interruptions, it is additionally desirable to bring the hygroscopic gauze into vapor pressure equilibrium with a suitable atmosphere having the requisite vapor pressure of water. Furthermore, so that the operation can be done continuously within practicable space and time limits, the equilibrium should be established quickly within the shortest possible time.

Reference is now made to the accompanying drawing which illustrates diagrammatically a continuous process for realizing the aforementioned objectives. Of course, the term continuous as applied to the hereinafter described process refers up to and including producing the cut sealed packages since the sterilization of the cut packages in the autoclave is a batch operation because of the attended pressure requirements. Gauge 1, unwound from a gauze roll 2 is conveyed through a humidity chamber 3 over rollers 4–9. The conditions and construction of the humidifying chamber are such that the gauze is passed through a humidifying space of relative humidity of 88–92% at 100° F. within a time interval of one minute (residence time). Under these conditions cotton gauze was found to absorb 7–8% of the dry weight as moisture and not to vary appreciably in its moisture content when the time interval was extended indefinitely. It was further found that the equilibrium moisture absorption of the cotton gauze fell within the desired range of 5–10% if the relative humidity were maintained between the limits of 82–95% at 100° F. At a temperature of 120° F., the moisture absorption is slightly higher (by about 1% of the weight of the gauze) so that, accordingly, at the higher temperature slightly lower humidities are required to maintain the desired proportional moisture absorption. Of course, higher or lower temperatures than those stated would give equally satisfactory moisture absorption values, provided the relative humidity and exposure times were suitably adjusted.

The preconditioned gauze 1' emerging from the humidity chamber 3 over roller 9 is then passed through a petrolatum bath at 130–140° F. by means of rollers 11–14. Squeeze rollers 13 and 14 are motor-driven and serve to pull the gauze from the gauze roll through the humidity chamber and petrolatum bath. Excess petrolatum is removed by squeeze rollers 13–14 and the gauze led to a conventional pleating machine 15 where it is formed and cut to yield pleated dressings 16 similar in pattern to those disclosed in U.S. Patents 2,402,981 and 2,402,982. The dressings 16 are carried by a conveyor belt 17 past nozzles 18 which supply each dressing with additional impregnant, if needed, to a conventional packaging and cutting machine 19 which encloses the dressings between two layers of laminated film 20 and forms hermetically sealed envelopes 21 containing the completed dressings, which are then cut into individual packages in any conventional manner such as by a cutting knife. The cut packages are supported in any suitable manner such as a removal tray positioned in the packaging and cutting machine. It is desirable to form the envelope around the dressings in such a manner as to minimize the volume of air incorporated therein. Suitable techniques for this purpose have been described in detail hereinbefore. For example, after portions along the length of the ointment impregnated gauze have been enclosed by the foil to form packages, prior to heat sealing each package, the foil envelope thereof is subjected to pressure to reduce, as much as possible, the air content thereof.

The impregnation of the humidified gauze with petrolatum immediately after the gauze emerges from the humidity chamber has the advantage of locking the moisture in the gauze and prevents appreciable loss thereof during the remainder of the operation and before the final packaging step.

The hermetically sealed packages are then transferred by hand, or by any suitable means, to trays in which they are distributed in layers several packages thick. The trays are positioned in racks in a conventional autoclave and the packages are sterilized therein, by heating in a mixture of air and saturated steam at 250° F. for 30 minutes, the timing of the sterilization cycle beginning after the packages have reached sterilization temperature.

To insure effective heat distribution within the autoclave, the steam pressure is maintained at its saturation value, 15.1 p.s.i.g. at 250° F., and, additionally, to compensate for the higher pressure developed inside the package, in accord with the principles set forth in the foregoing section, an air pressure of about 10 p.s.i is provided, bringing the total autoclave pressure to 25 p.s.i.g. Since some of the advantage of steam is lost when it is diluted with an inert gas, the autoclave is provided with a fan to force convection throughout the autoclave load.

To avoid too much condensation within the autoclave load and the attendant problem of drying, it is preferred to preheat the autoclave load with air only in the autoclave to a temperature somewhat below the sterilization temperature, and to introduce steam just prior to the beginning of sterilization cycle.

The invention in its broader aspects is not limited to the specific steps, methods, combinations and improvements described but departures may be made therefrom within the scope of the accompanying claims without departing from the principles of the invention and without sacrificing its chief advantages.

What is claimed is:

1. A process for the sterilization of an ointment impregnated gauze which comprises the steps of: preconditioning a gauze under such conditions that there is uniformly distributed therethrough, water in an amount of at least 5% by weight of the dry gauze; impregnating the preconditioned gauze with an ointment; enclosing said ointment impregnated gauze in an envelope of a flexible protective material to form a package; hermetically sealing said package; and, heating said package in a pressure chamber under suitable conditions of temperature, pressure and time to effect sterilization of the ointment impregnated gauze without causing distortion of the envelope.

2. A process according to claim 1 wherein prior to heat sealing the package, the air content of the envelope is reduced to a point where only a moderate proportion of additional external gaseous medium be needed to prevent rupture of the package.

3. A process according to claim 1 wherein the gauze is preconditioned in such a manner that the moisture content is in the range of 5 to 10%.

4. A process according to claim 1 wherein the petrolatum is in an amount from 100% to 500% by weight of the gauze.

5. A process according to claim 1 wherein the hermetically sealed package is heated in an autoclave with a mixture of steam and air at 250° F. for 30 minutes.

6. A process according to claim 1 wherein the ointment is petrolatum.

7. A process for the sterilization of an ointment impregnated gauze which is continuous up to and including forming a sealed package containing an ointment impregnated gauze, which comprises feeding gauze through a humidifying zone so that there is uniformly distributed therethrough, water in an amount of at least 5% by weight of the dry gauze, passing the gauze to an impregnation zone to impregnate the gauze with an ointment, passing said ointment-impregnated gauze to a packaging zone and cutting zone so as to form a plurality of heat sealed packages each of which comprises a portion of the ointment impregnated gauze enclosed in an envelope of a flexible protective material to form a package; and, passing each of said packages to a pressure chamber and heating each package therein under suitable conditions of temperature, pressure and time to effect sterilization of the ointment impregnated gauze contained in the envelope without causing distortion of said envelope.

8. A process according to claim 7 wherein prior to heat sealing the individual cut packages, the air content of each envelope is reduced to a point where only a moderate proportion of additional external gaseous medium be needed to prevent rupture of the package.

9. A process according to claim 7 wherein the gauze is preconditioned in such a manner that the moisture content is 5 to 10%.

10. A process according to claim 7 wherein the petrolatum is in an amount from 100% to 500% by weight of the gauze.

11. A process according to claim 7 wherein the hermetically sealed package is heated in an autoclave with a mixture of steam and air at 250° F. for 30 minutes.

12. A process according to claim 7 wherein the ointment is petrolatum.

13. A process according to claim 7 wherein the preconditioned gauze is impregnated with the ointment by passing said gauze through an ointment bath.

14. A process according to claim 7 wherein the ointment impregnated gauze prior to being passed to the packaging and cutting operation is subjected to a pleating and cutting operation to obtain a plurality of dressings having a pleated pattern.

No references cited.

MORRIS O. WOLK, *Primary Examiner.*

M. E. ROGERS, *Examiner.*